(12) United States Patent
Yatsu (10) Patent No.: US 9,605,667 B2
(45) Date of Patent: Mar. 28, 2017

(54) CRYOPUMP AND METHOD FOR VACUUM PUMPING NON-CONDENSABLE GAS

(71) Applicant: Sumitomo Heavy Industries, Ltd., Tokyo (JP)

(72) Inventor: Takahiro Yatsu, Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 151 days.

(21) Appl. No.: 14/219,720

(22) Filed: Mar. 19, 2014

(65) Prior Publication Data

US 2014/0283531 A1 Sep. 25, 2014

(30) Foreign Application Priority Data

Mar. 19, 2013 (JP) ................. 2013-057050

(51) Int. Cl.
- *B01D 8/00* (2006.01)
- *F25B 19/00* (2006.01)
- *F04B 37/08* (2006.01)
- *F04B 37/04* (2006.01)
- *F04B 37/02* (2006.01)

(52) U.S. Cl.
CPC ............ *F04B 37/08* (2013.01); *F04B 37/085* (2013.01); *B01D 8/00* (2013.01); *F04B 37/02* (2013.01); *F04B 37/04* (2013.01)

(58) Field of Classification Search
CPC .......... B01D 8/00; F04B 37/085; F04B 37/02; F04B 37/04; F04B 37/08
USPC .................... 62/55.5, 100; 417/901
See application file for complete search history.

(56) References Cited

U.S. PATENT DOCUMENTS

| | | | |
|---|---|---|---|
| 4,494,381 A | 1/1985 | Lessard | |
| 4,530,213 A * | 7/1985 | Kadi | F04B 37/08 417/901 |
| 4,718,240 A | 1/1988 | Andeen et al. | |
| 4,718,241 A * | 1/1988 | Lessard | F04B 37/08 417/901 |
| 5,582,017 A | 12/1996 | Noji et al. | |
| 2009/0038319 A1* | 2/2009 | Tsuyuki | F04B 37/08 62/55.5 |

(Continued)

FOREIGN PATENT DOCUMENTS

| | | |
|---|---|---|
| EP | 0 921 311 A2 | 6/1999 |
| JP | S62-502276 A | 9/1987 |

(Continued)

*Primary Examiner* — Frantz Jules
*Assistant Examiner* — Steve Tanenbaum
(74) *Attorney, Agent, or Firm* — Michael Best & Friedrich LLP (57) ABSTRACT

A cryopump includes: a radiation shield that includes a shield front end that defines a shield opening, a shield bottom portion, and a shield side portion that extends between the shield front end and the shield bottom portion; and a cryopanel assembly that is cooled to a lower temperature than that of the radiation shield. The cryopanel assembly includes a first panel arrangement including a plurality of first adsorption panels and a plurality of second panel arrangements each including a plurality of second adsorption panels. The first panel arrangement forms a multitude of adsorption sections arranged in a lattice-shaped pattern in cooperation with the plurality of second panel arrangements, each of the adsorption sections being exposed to the shield side portion.

14 Claims, 4 Drawing Sheets

(56) References Cited

U.S. PATENT DOCUMENTS

2010/0077771 A1    4/2010   Tanaka

FOREIGN PATENT DOCUMENTS

| | | | |
|---|---|---|---|
| JP | 2009-057957 A | | 3/2009 |
| JP | 2009-062891 A | | 3/2009 |
| JP | 2009-062892 A | | 3/2009 |
| JP | 2009062891 A | * | 3/2009 |
| TW | 200923209 A | | 6/2009 |
| WO | WO-86/05240 | | 9/1986 |

* cited by examiner

CRYOPUMP AND METHOD FOR VACUUM PUMPING NON-CONDENSABLE GAS

BACKGROUND

1. Technical Field

The present invention relates to a cryopump and a method for vacuum pumping a non-condensable gas.

2. Description of the Related Art

A cryopump is a vacuum pump that captures and pumps gas molecules by condensing or adsorbing molecules on a cryopanel cooled to an extremely low temperature. A cryopump is generally used to achieve a clean vacuum environment required in a semiconductor circuit manufacturing process and the like. One of the applications of a cryopump includes a case where, for example, a non-condensable gas such as hydrogen makes up most of gas to be pumped, as in the case of, for example, an ion implantation step. The only way of pumping a non-condensable gas is to adsorb the non-condensable gas on an adsorption area that is cooled to an extremely-low temperature.

SUMMARY

An exemplary purpose of an embodiment of the present invention is to provide a cryopump that is suitable for pumping a non-condensable gas and a vacuum pumping method.

According to one embodiment of the present invention, there is provided a cryopump including: a radiation shield including a shield front end that defines a shield opening, a shield bottom portion, and a shield side portion that extends between the shield front end and the shield bottom portion; and a cryopanel assembly cooled to a lower temperature than that of the radiation shield, including a first panel arrangement including a plurality of first adsorption panels, and a plurality of second panel arrangements each including a plurality of second adsorption panels. The first panel arrangement forms a multitude of adsorption sections arranged in a lattice-shaped pattern in cooperation with the plurality of second panel arrangements, each of the adsorption sections being exposed to the shield side portion.

According to one embodiment of the present invention, there is provided a method for vacuum pumping a non-condensable gas, including: receiving a non-condensable gas molecule between a radiation shield of a cryopump and a cryopanel assembly that is cooled to a lower temperature than that of the radiation shield; and adsorbing the non-condensable gas molecule on a lattice-like adsorption panel arrangement of the cryopanel assembly, wherein the lattice-like adsorption panel arrangement includes a multitude of adsorption sections each being exposed to a side portion of the radiation shield.

According to one embodiment of the present invention, there is provided a cryopump including: a radiation shield including a shield front end that defines a shield opening, a shield bottom portion, and a shield side portion that extends between the shield front end and the shield bottom portion; and a cryopanel assembly cooled to a lower temperature than that of the radiation shield, including a plurality of adsorption section arrays that are arranged in a multi-layered way between the shield opening and the shield bottom portion. Each of the plurality of adsorption section arrays includes a plurality of adsorption sections. Each of the plurality of adsorption sections includes a ceiling portion that covers the adsorption section and an opening part that is exposed to the shield side portion.

Optional combinations of the aforementioned constituting elements, and implementations of the invention in the form of methods, apparatuses, and systems, may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

The invention will now be described by reference to the preferred embodiments. This does not intend to limit the scope of the present invention, but to exemplify the invention.

Figure 1:
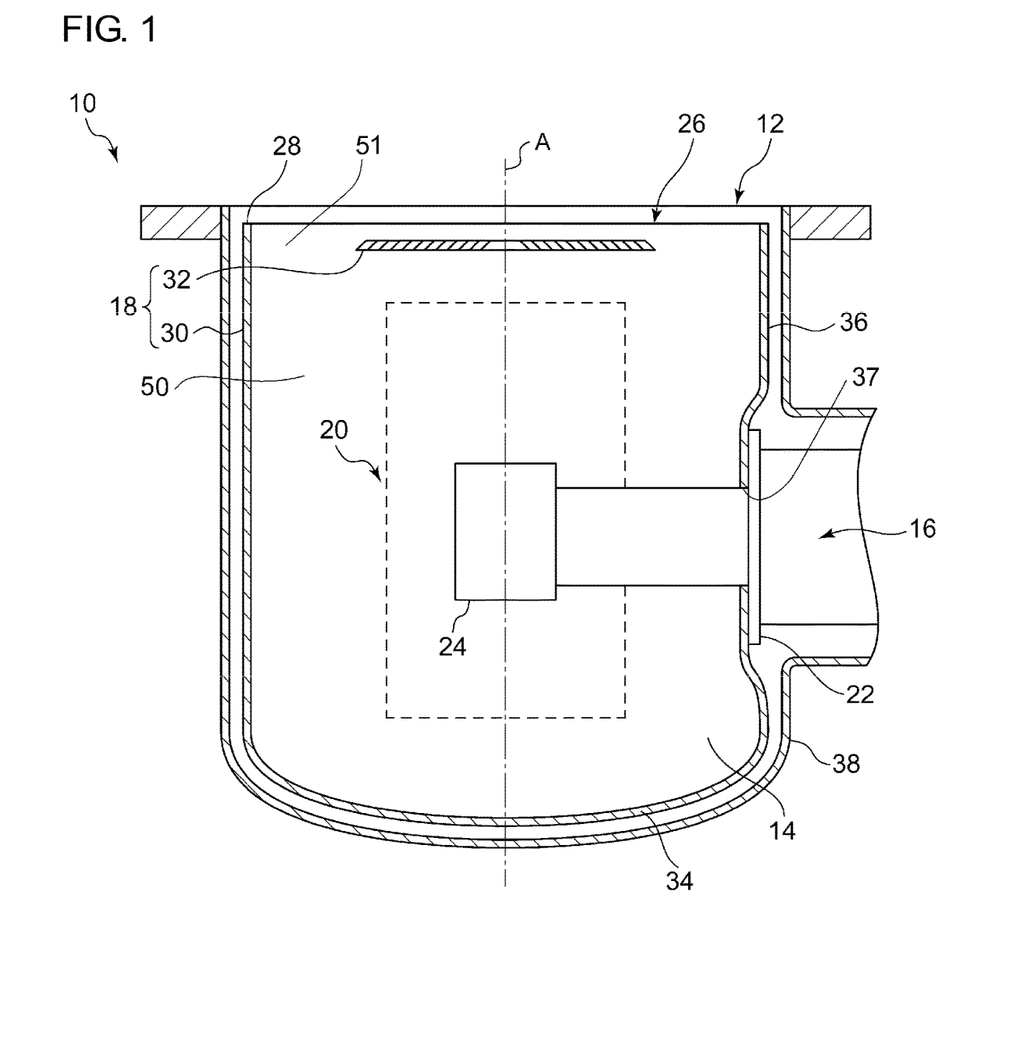
FIG. 1 is a cross-sectional view schematically illustrating the principal part of a cryopump according to an embodiment of the present invention.

FIG. 1 is a cross-sectional view schematically illustrating the principal part of a cryopump 10 according to an embodiment of the present invention. The cryopump 10 is installed on a vacuum chamber in, for example, an ion implantation apparatus, sputtering apparatus, or the like, to be used for improving the vacuum degree of the inside of the vacuum chamber to a level required in a desired process. The cryopump 10 includes an inlet 12 for receiving gas. Gas to be pumped enters an internal space 14 of the cryopump 10 via the inlet 12 from the vacuum chamber on which the cryopump 10 is mounted. FIG. 1 illustrates a cross section including a central axis A of the internal space 14 of the cryopump 10.

In the following, terms "axial direction" and "radial direction" are often used to facilitate the understanding of a positional relationship of constituting elements of the cryopump 10. The axial direction represents a direction passing through the inlet 12 (a direction along a dashed-dotted line A in FIG. 1), and the radial direction represents a direction along the inlet 12 (a direction perpendicular to the dashed-dotted line A). For the sake of convenience, relative closeness to the inlet 12 in the axial direction may be referred to as "upper" and "upward," and relative remoteness therefrom may be referred to as "lower" and "downward." In other words, relative remoteness from the bottom of the cryopump 10 may be referred to as "upper" and "upward," and relative closeness thereto may be referred to as "lower" and "downward," both in the axial direction. With respect to the radial direction, relative closeness to the center of the inlet 12 (a central axis A in FIG. 1) may be referred to as "inner" and "inside," and relative closeness to the circumference of the inlet 12 may be referred to as "outer" and "outside." It should be noted that these expressions are not related to a position of the cryopump 10 as mounted on a vacuum chamber. For example, the cryopump 10 may be mounted on a vacuum chamber in such a manner that the inlet 12 faces downward in the vertical direction.

A direction that surrounds the axial direction may be referred to as "circumferential direction." A circumferential direction is a second direction along the inlet 12 and is a tangential direction that is orthogonal to the radial direction.

The cryopump 10 includes a refrigerator 16. The refrigerator 16 is, for example, a cryogenic refrigerator such as a Gifford-McMahon refrigerator (so-called GM refrigerator). The refrigerator 16 is a two-stage refrigerator provided with a first stage 22 and a second stage 24. The refrigerator 16 is configured to cool the first stage 22 to a first temperature level and cool the second stage 24 to a second temperature level. The second temperature level is lower than the first temperature level. For example, the first stage 22 is cooled to approximately 65 K to 120 K and preferably to 80 K to 100 K, and the second stage 24 is cooled to approximately 10 K to 20 K.

The cryopump 10 illustrated in FIG. 1 is a so-called horizontal-type cryopump. In general, a horizontal-type cryopump is a cryopump arranged such that the refrigerator 16 intersects (orthogonally in general) with the central axis A of the internal space 14 of the cryopump 10. The present invention is also applicable to a so-called vertical-type cryopump in a similar manner. A vertical-type cryopump is a cryopump with a refrigerator arranged along the axial direction of the cryopump.

The cryopump 10 includes a high-temperature cryopanel 18 and a cryopanel assembly 20, which is cooled to a lower temperature than that of the high-temperature cryopanel 18. The high-temperature cryopanel 18 is a cryopanel that is provided to protect the cryopanel assembly 20 from radiant heat from a cryopump housing 38 or the outside of the cryopump 10. A clearance is provided between the high-temperature cryopanel 18 and the cryopanel assembly 20 and hence the high-temperature cryopanel 18 is not in contact with the cryopanel assembly 20. The high-temperature cryopanel 18 includes a radiation shield 30 and an inlet cryopanel 32 and encloses the cryopanel assembly 20. The high-temperature cryopanel 18 is thermally connected to the first stage 22. Therefore, the high-temperature cryopanel 18 is cooled to the first temperature level.

The radiation shield 30 is provided to protect the cryopanel assembly 20 from radiant heat emitted from the cryopump housing 38. The radiation shield 30 is located between the cryopump housing 38 and the cryopanel assembly 20 and encloses the cryopanel assembly 20. The radiation shield 30 includes a shield front end 28 that defines a shield opening 26, a shield bottom portion 34 that faces the shield opening 26, and a shield side portion 36 that extends from the shield front end 28 to the shield bottom portion 34. The shield opening 26 is located at the inlet 12. The radiation shield 30 has a tubular shape (e.g., cylindrical) where the shield bottom portion 34 is closed and is formed into a cup-like shape.

The shield side portion 36 has a mounting hole 37 for the refrigerator 16, and the second stage 24 of the refrigerator 16 is inserted inside the radiation shield 30 via the mounting hole 37. The first stage 22 is fixed to the outer surface of the radiation shield 30 at the circumference of the mounting hole 37. The radiation shield 30 is thermally connected to the first stage 22 in this way. A heat transfer member may be provided to connect the radiation shield 30 to the first stage 22. One end of the heat transfer member is fixed to the circumferential portion of the refrigerator mounting hole and the other end is fixed to the first stage 22. The heat transfer member is, for example, a hollow short tube and extends between the radiation shield 30 and the first stage 22 along the central axis of the refrigerator 16.

The radiation shield 30 forms a gas receiving space 50 that surrounds the cryopanel assembly 20. The gas receiving space 50 is an outer portion of the internal space 14 of the cryopump 10 and is an area that is adjacent to the radiation shield 30 on the inner side in the radial direction. The gas receiving space 50 surrounds the periphery of the cryopanel assembly 20 all along the axial direction from the shield opening 26 to the shield bottom portion 34.

In the present embodiment, the radiation shield 30 is formed into a one-piece tubular shape as illustrated. Alternatively, the radiation shield 30 may be formed with a plurality of parts to have a tubular shape as a whole. The plurality of parts may be arranged so as to have gaps among one another. For example, the radiation shield 30 may be divided into two portions in the axial direction. In this case, the upper portion of the radiation shield 30 is a tube whose both ends are open and includes the shield front end 28 and a first portion of the shield side portion 36. The lower portion of the radiation shield 30 has an open upper end and a closed lower end and hence includes a second portion of the shield side portion 36 and the shield bottom portion 34. Between the first portion and the second portion of the shield side portion 36 formed is a gap extending in the circumferential direction. The upper half of the mounting hole 37 for the refrigerator 16 is formed at the first portion of the shield side portion 36, and the lower half thereof is formed at the second portion of the shield side portion 36.

The inlet cryopanel 32 is provided at the inlet 12 (or the shield opening 26, and the same applies hereinafter) to protect the cryopanel assembly 20 from radiant heat emitted from a heat source outside the cryopump 10 (for example, a heat source inside the vacuum chamber on which the cryopump 10 is mounted). A gas (for example, moisture) that condenses at a cooling temperature of the inlet cryopanel 32 is trapped on the surface thereof.

The inlet cryopanel 32 is arranged at a place that corresponds to the cryopanel assembly 20 in the inlet 12. The inlet cryopanel 32 occupies the central part of the opening area of the inlet 12 and forms an annular open area 51 between the radiation shield 30 and the inlet cryopanel 32. The open area 51 is arranged at a place that corresponds to the gas receiving space 50 in the inlet 12. Since the gas receiving space 50 is located at the outer circumferential portion of the internal space 14 in such a manner that the gas receiving space 50 surrounds the cryopanel assembly 20, the open area 51 is located at the outer circumferential portion of the inlet 12. The open area 51 is an entrance to the gas receiving space 50, and the cryopump 10 receives gas in the gas receiving space 50 via the open area 51.

The inlet cryopanel 32 is mounted to the shield front end 28 via a mounting member (not shown). As described, the inlet cryopanel 32 is fixed to the radiation shield 30 and is thermally connected to the radiation shield 30. Although the inlet cryopanel 32 is located proximate to the cryopanel assembly 20, the inlet cryopanel 32 is not in contact with cryopanel assembly 20.

The inlet cryopanel 32 has a planar structure arranged at the inlet 12. The inlet cryopanel 32 may include, for example, a flat (e.g., disc) plate. Alternatively, the inlet cryopanel 32 may include a louver or a chevron that is formed concentrically or in a lattice shape. The inlet cryopanel 32 may be arranged such that the inlet cryopanel 32 goes across the entire inlet 12. In that case, the open area 51 may be formed by removing part of the plate or removing one or more louver boards of the louver or the chevron.

The cryopanel assembly 20 is arranged in a center portion of the internal space 14 of the cryopump 10. FIG. 1 shows, by a broken line, an approximate area in which the cryopanel assembly 20 is installed. For example, the cryopanel assembly 20 is arranged in a layout where the cryopanel assembly 20 surrounds the central axis A of the radiation shield 30. The upper portion, the side portion, and the lower portion of the cryopanel assembly 20 face the inlet cryopanel 32, the shield side portion 36, and the shield bottom portion 34, respectively.

Figure 2:
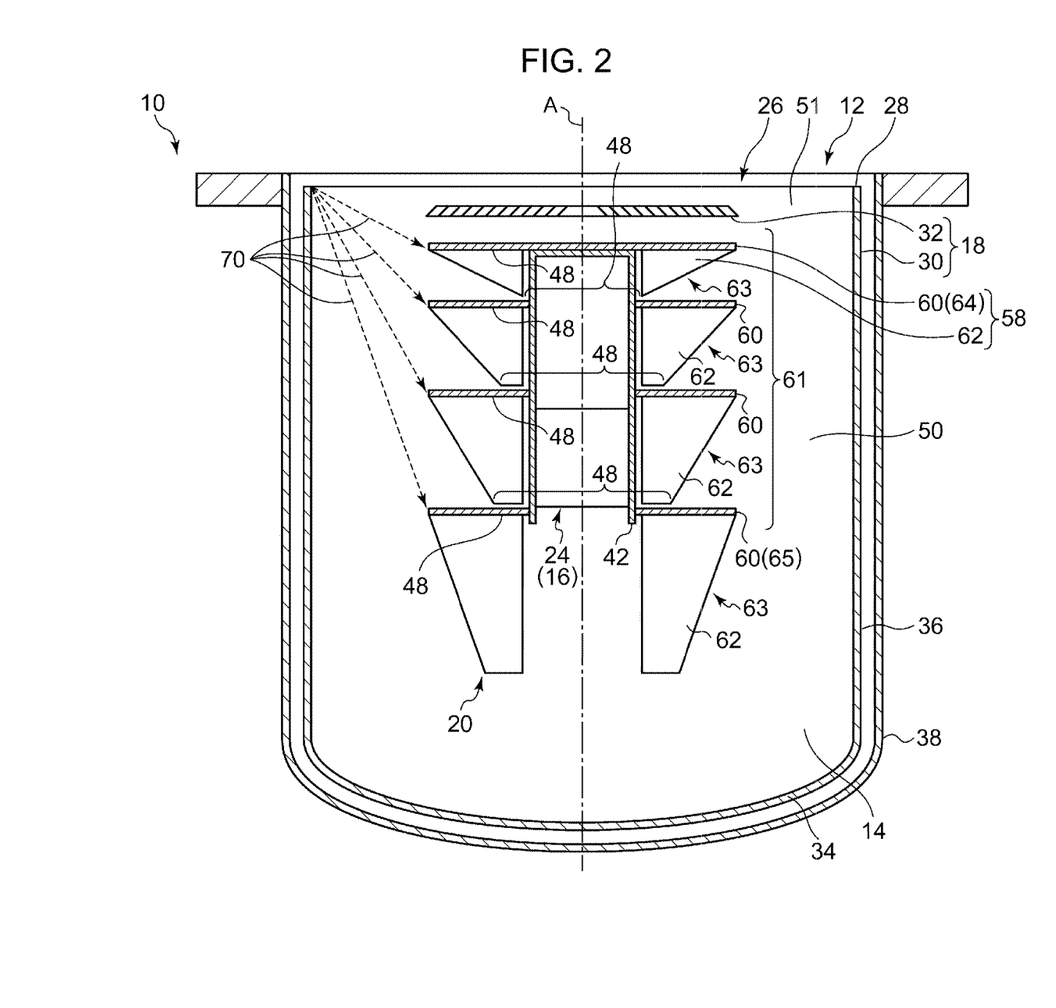
FIG. 2 is a cross-sectional side view schematically illustrating a cryopanel assembly according to an embodiment of the present invention.

An adsorption area 48 is formed on at least part of the surface of the cryopanel assembly 20 (see FIG. 2). A detailed explanation thereof will be described later. The adsorption area 48 is provided to capture a non-condensable gas (e.g., hydrogen) by adsorption. The adsorption area 48 is formed by, for example, attaching an adsorbent (e.g., activated charcoal) to the cryopanel surface. Further, a condensation area for capturing a condensable gas by condensation is formed on at least part of the cryopanel assembly 20. The condensation area is, for example, an area where the surface (e.g., metal surface) of a cryopanel substrate is exposed and, in other words, a section where the absorbent is absent on a cryopanel surface. Therefore, the condensation area can be also called a non-adsorption area. Therefore, the cryopanel assembly 20 includes an adsorption panel or a cryosorption panel that has a condensation area (also referred to as non-adsorption area) on part thereof.

Figure 3:
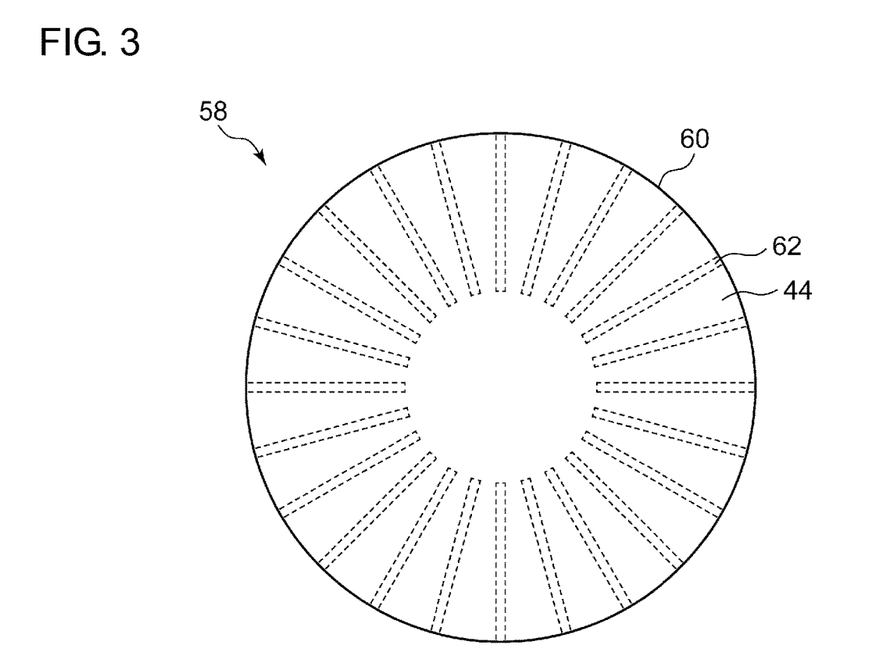
FIG. 3 is a top view schematically illustrating the top cryopanel unit of a cryopanel assembly according to an embodiment of the present invention.
Figure 4:
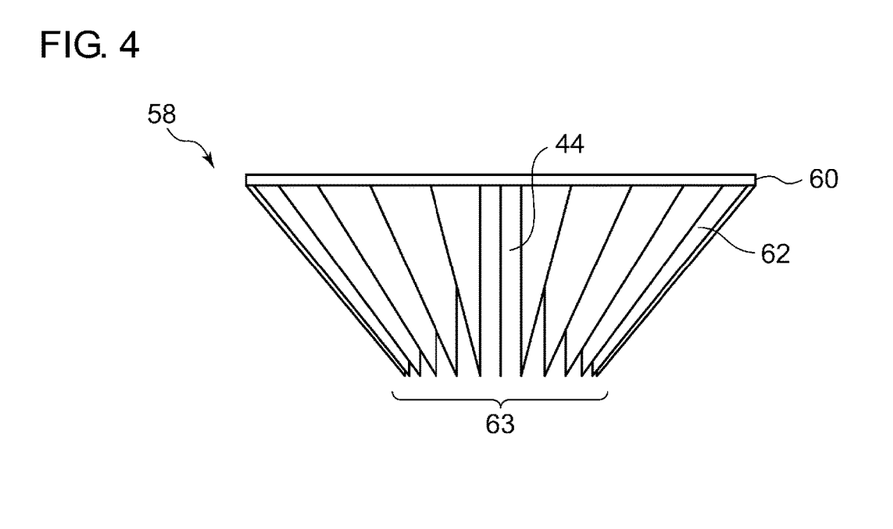
FIG. 4 is a lateral view schematically illustrating the top cryopanel unit of a cryopanel assembly according to an embodiment of the present invention.

FIG. 2 is a cross-sectional side view schematically illustrating a cryopanel assembly 20 according to an embodiment of the present invention. In FIG. 2, a refrigerator 16 (see FIG. 1) is arranged from the back side to the front side on the page. FIGS. 3 and 4 are a top view and a lateral view, respectively, each schematically illustrating a top cryopanel unit 58 of the cryopanel assembly 20.

The cryopanel assembly 20 includes a large number of adsorption panels and a panel mounting member 42 for mounting the adsorption panels to the second stage 24. The cryopanel assembly 20 is mounted to the second stage 24 via the panel mounting member 42. In this way, the cryopanel assembly 20 is thermally connected to the second stage 24. Thus, the cryopanel assembly 20 is cooled to the second temperature level.

The panel mounting member 42 is an element that arranges the adsorption panels fixedly in accordance with a designed panel layout and forms heat transfer paths from the second stage 24 to the adsorption panels. The panel mounting member 42 is provided with an upper surface that is directed to the inlet 12 and a side surface that extends downward from the upper surface. The side surface is mounted on the second stage 24.

The cryopanel assembly 20 includes two types of adsorption panels, i.e., a flat plate panel 60 and a vertical plate panel 62. Thus, the flat plate panel 60 and the vertical plate panel 62 can be also called a first adsorption panel and a second adsorption panel, respectively.

The cryopanel assembly 20 includes a plurality of cryopanel units 58, and each of the plurality of cryopanel units 58 is formed by a combination of these two types of adsorption panels. The plurality of cryopanel units 58 are arranged in line in the axial direction. These cryopanel units 58 are arranged such that two adjacent cryopanel units 58 are located proximate to or in contact with each other. In this way, the cryopanel assembly 20 has a multi-stacked arrangement of the cryopanel units 58.

The cryopanel assembly 20 includes a plurality of flat plate panels 60 that form a first panel arrangement 61. These flat plate panels 60 are arranged in the axial direction of the cryopump 10. Each of the flat plate panels 60 is arranged such that the flat plate panel 60 goes across the center portion of the internal space 14. Each of the flat plate panels 60 is, for example, a circular flat plate. The flat plate panels 60 are each provided with a front surface, which is a main surface, and a back surface. The front surface of the flat plate panel 60 is directed toward the shield opening 26, and the back surface of the flat plate panel 60 is directed toward the shield bottom portion 34.

The flat plate panel 60 extends radially outward from the central axis A. The center of the flat plate panel 60 is located on the central axis A and is therefore arranged coaxially with the radiation shield 30. The outer circumferential portion of the flat plate panel 60 protrudes radially outward and faces the shield side portion 36.

The flat plate panels 60 are arranged parallel to an opening plane defined by the shield opening 26. In other words, the back surface of one of the two adjacent flat plate panel 60 that is closer to the inlet 12 and the front surface of the other one of the flat plate panels 60 that is farther from the inlet 12 face each other while being parallel to each other. For the sake of ease of explanation, the closest flat plate panel 60 among the plurality of flat plate panels 60 to the inlet 12 may be referred to as a top panel 64, and the closest flat plate panel 60 among the plurality of flat plate panels 60 to the shield bottom portion 34 may be referred to as a bottom panel 65 in the present specification. The front surface of the top panel 64 is directed toward the inlet cryopanel 32. On the other hand, the back surface of the bottom panel 65 is directed toward the shield bottom portion 34.

The top panel 64 may be placed close to the inlet cryopanel 32. For example, a distance between the top panel 64 and the inlet cryopanel 32 may be shorter than a distance between the top panel 64 and the adjacent flat plate panel 60 located below the top panel 64 in the axial direction. By placing the top panel 64 on the uppermost side in the axial direction as described above, the first panel arrangement 61 is provided with a larger number of flat plate panels 60 arranged from the shield opening 26 toward the shield bottom portion 34. This helps to enlarge the adsorption area of the cryopanel assembly 20.

Each of the flat plate panels 60 is mounted at its center portion to the panel mounting member 42. The top panel 64 is fixed on the upper surface of the panel mounting member 42, and the rest of the flat plate panels 60 are fixed to the side surface of the panel mounting member 42. In the central portion of the flat plate panels other than the top panel 64 formed is an opening or cutout for insertion of the panel mounting member 42 thereinto. Further, in a flat plate panel 60 that is located at the same height as the refrigerator 16 in the axial direction, a further opening or cutout for avoiding interference with the refrigerator 16 is formed.

The respective outer circumferential portions of the plurality of flat plate panels 60 have the same dimension (e.g., the same diameter) as shown in the figure. However, the plurality of flat plate panels 60 may have a different shape and/or dimension (e.g., different diameter) from each other. A certain flat plate panel 60 among the plurality of flat plate panels 60 may have the same shape as that of an adjacent flat plate panel 60 on the upper side or may be larger than the adjacent flat plate panel 60. As a result, the bottom panel 65 may be larger than the top panel 64.

An interval between a pair of adjacent flat plate panels 60 is different from an interval of another pair of adjacent flat plate panels 60 as shown in the figure. The flat plate panel interval on the upper side in the axial direction is smaller than that on the lower side in the axial direction. The interval is determined by the respective length, in the axial direction, of the vertical plate panel 62 provided between the respective pair of adjacent flat plate panels 60. However, the interval may be constant in the plurality of flat plate panels 60.

The interval between two adjacent flat plate panels 60 forms an open portion that continues to the gas receiving space 50. In other words, a clearance between two adjacent flat plate panels 60 is open to the gas receiving space 50. No shielding that prevents the flowing of gas is provided between the respective outer ends of the flat plate panels 60 and the shield side portion 36.

The entire back surface of each of the flat plate panels 60 is provided as an adsorption area 48. Further, the central portion of the front surface of each of the flat plate panels 60 is provided as an adsorption area 48. Note that no adsorption area 48 is formed on the front surface of the top panel 64. Therefore, condensation areas are formed on the front surface of the top panel 64 and the respective front surface outer circumferential portions of the rest of the flat plate panels 60.

The trajectory of a line of sight 70 projected on a given flat plate panel 60 defines a boundary between the adsorption area and the condensation area. This line of sight 70 is a straight line drawn from the shield front end 28 to the outer circumferential end of an adjacent flat plate panel 60 located immediately above the given flat plate panel 60. The line of sight 70 is further extended from the outer circumferential end to the given flat plate panel 60 located immediately below and thereby makes an intersection point on the front surface of the given flat plate panel. Based on the trajectory of the intersection point obtained when the line of sight 70 is moved along the shield front end 28, the boundary between the adsorption area 48 and the condensation area is determined. The adsorption area 48 is formed on at least part of a region inside the boundary, and the adsorption area 48 preferably occupies the entire region inside the boundary. In this way, the adsorption area 48 on the given flat plate panels 60 is covered by the adjacent flat plate panel 60 located immediately above the given flat plate panel 60. The adsorption area 48 on each of the flat plate panels 60 is set such that the adsorption area 48 is substantially invisible from the shield opening 26.

Gas accumulated in a cryopump is normally discharged substantially completely by a regeneration process. When the regeneration process is completed, the cryopump is recovered to have pumping performance according to the specifications. However, some constituents of accumulated gas are relatively more likely to remain in the adsorbent even after the regeneration process.

For example, it has been observed in a cryopump installed for vacuum pumping of an ion implantation apparatus that adhesive materials attach to activated charcoal that serves as an adsorbent. It has been difficult to completely remove these adhesive materials even by the regeneration process. These adhesive materials are considered to result from an organic outgas that is discharged from a photoresist coating on a substrate to be processed. It is also possible that these adhesive materials result from a poisonous gas used as a dopant gas, i.e., a source gas during an ion implantation process. There is also a possibility that the adhesive materials result from other byproduct gases in the ion implantation process. It is also possible the adhesive materials are created due to the complex interaction of these gases.

Most of the gas to be pumped where a cryopump is used in the ion implantation process can be hydrogen gas. The hydrogen gas is substantially completely discharged to the outside by regeneration. If there is only a tiny amount of a hard-to-regenerate gas, an insignificant effect on the pumping performance of the cryopump will be found after a single cryopumping process. However, it is possible that the hard-to-regenerate gas is gradually accumulated in the adsorbent through the repetition of cryopumping and regeneration processes, thereby lowering the pumping performance. When the pumping performance drops below an acceptable range, maintenance work including, for example, an exchange of either an adsorbent or a cryopanel along with the adsorbent, or a chemical treatment on the adsorbent of removing the hard-to-regenerate gas, will be required.

Almost without exception, the hard-to-regenerate gas is a condensable gas. A molecule of condensable gas that flies from the outside towards the cryopump 10 is captured by the condensation areas of the flat plate panels 60 or the radiation shield 30 after passing through the open area 51 and the gas receiving space 50. By avoiding the exposure of the adsorption areas 48 to the inlet 12, the adsorption areas 48 are protected from the hard-to-regenerate gas contained in the gas entering the cryopump 10. The hard-to-regenerate gas is accumulated on the condensation areas. In this way, both the protection of the adsorption areas 48 from the hard-to-regenerate gas and the high-speed pumping of a non-condensable gas can be achieved. Prevention of the exposure of the adsorption areas 48 is also useful in protecting the adsorption areas from moisture.

In the present embodiment, the adsorption areas 48 are invisible from the inlet 12. In other words, a "visible rate of adsorbent", which means a percentage of an area of visible adsorbent in the entire area of the adsorbent on the cryopanel assembly 20, is 0%. However, the present invention is not limited to the arrangement where the visible rate of adsorbent is 0%. When the visible rate of adsorbent is less than 7%, it may be determined that the adsorbent is substantially invisible from the opening. In an embodiment, the visible rate of adsorbent is preferably less than 7%, less than 5%, or less than 3%. However, for example, when the content of the hard-to-regenerate gas is expected to be sufficiently low, or when the exposed adsorbent is allowed to be sacrificed, the visible rate of adsorbent more than 7% could be acceptable.

The cryopump proposed earlier by the present applicant is also provided with a cryopanel assembly or an array of cryosorption panels that is suitable for the high-speed pumping of non-condensable gas. Such a cryopanel assembly may be used as the first panel arrangement 61 of the cryopump 10 according to the present embodiment. The cryopump that is proposed earlier by the present applicant is disclosed in, for example, Japanese Unexamined Patent Publication No. 2012-237262 and Published U.S. Patent Application No. 2013/0008189, which are incorporated herein in their entirety by reference.

Further, the cryopanel assembly 20 includes a plurality of vertical plate panels 62 that form a second panel arrangement 63. A second panel arrangement 63 is provided for each of the flat plate panels 60. Therefore, the cryopanel assembly 20 includes a plurality of second panel arrangements 63 in the same number as the number of the flat plate panels 60.

The plurality of vertical plate panels 62 of the second panel arrangement 63 are arranged on the lower side of the corresponding flat plate panel 60. Therefore, each of the plurality of second panel arrangements 63 is located between two adjacent flat plate panels 60. Note that the vertical plate panels 62 provided for the bottom panel 65 are located between the bottom panel 65 and the shield bottom portion 34.

The vertical plate panels 62 are arranged in a circumferential direction of the cryopump 10. The vertical plate panels 62 are, for example, polygonal plates and are, for example, triangular (or quadrangular such as square, rectangular, or trapezoidal) plates. The vertical plate panels 62 are arranged such that the respective main surfaces thereof are directed in the circumferential direction. Therefore, the vertical plate panels 62 are arranged such that two adjacent vertical plate panels 62 face each other in the circumferential direction. The vertical plate panels 62 extend along the axial direction and the radial direction. The vertical plate panels 62 are arranged, for example, at equal angular intervals.

The respective outer edge portions of the vertical plate panels 62 protrude radially outward and face the shield side portion 36. The vertical plate panels 62 are arranged perpendicular to an opening plane defined by the shield opening 26. The vertical plate panels 62 are arranged radially from the central axis A. The vertical plate panels 62 are arranged outside the panel mounting member 42.

The same arrangement of vertical plate panels 62 is applied to the plurality of second panel arrangements 63. Therefore, the vertical plate panels 62 of a given second panel arrangement 63 are located at the same angular positions as those of an adjacent second panel arrangement 63. Therefore, each of the vertical plate panels 62 adjacently located above a given flat plate panel 60 and a corresponding vertical plate panel 62 adjacently located below the given flat plate panel 60 may form a single vertical plate panel that is continuous in the axial direction. The second panel arrangements 63 may have different arrangements from one another. For example, the vertical plate panels 62 of a given second panel arrangement 63 and the vertical plate panels 62 of another second panel arrangement 63 adjacent to the given second panel arrangement 63 may be placed alternately in the circumferential direction.

The vertical plate panels 62 are mounted to the back surface of the corresponding flat plate panel 60 and protrude downward from the flat plate panel 60. The vertical plate panels 62 are thermally connected to the panel mounting member 42 via the flat plate panel 60. The vertical plate panels 62 are not mounted to the adjacent flat plate panel 60 located below the vertical plate panels 62. In this way, a single cryopanel unit 58 is formed by a combination of the second panel arrangement 63 and the corresponding flat plate panel 60 located immediately above the second panel arrangement 63. In a cryopanel unit 58 that is located at the same height as the refrigerator 16 in the axial direction, one or more vertical plate panels 62 may be removed in order to avoid interference with the refrigerator 16.

The shape of a vertical plate panel 62 may be determined by the trajectory of a line of sight 70 projected on a flat plate panel 60. Based on the trajectory of the line of sight 70 obtained when the line of sight 70 is moved along the shield front end 28, the shape of a vertical plate panel 62 can be determined. The trajectory of the line of sight 70 forms a conical side surface when the shield front end 28 and the flat plate panels 60 are circular. For example, the shape of a vertical plate panel 62 is determined such that at least part of the vertical plate panel 62 is housed inside an area formed by the trajectory of the line of sight 70. Preferably, the shape of a vertical plate panel 62 is determined such that the entire vertical plate panel 62 is housed inside the area formed by the trajectory of the line of sight 70. In this way, the vertical plate panels 62 are covered by the adjacent flat plate panels 60 located immediately above them. The vertical plate panels 62 are shaped such that they are substantially invisible from the shield opening 26.

The vertical plate panels 62 have different shapes depending on the distance from the shield opening 26. In an embodiment shown in the figure, a vertical plate panel 62 below the top panel 64 is a right-angled triangle. This triangular vertical plate panel has a hypotenuse or oblique side that is directed radially outward. One of the other two sides is supported by the back surface of the top panel 64, and the other is placed close to the panel mounting member 42 while being directed to the inner side in the radial direction. A vertical plate panel 62 may be mounted to the panel mounting member 42. Further, a vertical plate panel 62 below any one of the flat plate panels 60 other than the top panel 64 is a right-angled trapezoid. This trapezoidal panel also has a hypotenuse that is directed radially outward in the same way as in the triangular panel. The long side (upper base) of the trapezoidal panel is supported by the back surface of the flat plate panel 60, and the shorter side (lower base) is directed downward in the axial direction.

The plurality of second panel arrangements 63 may include vertical plate panels 62 that has a common shape. For example, each of the second panel arrangements 63 may include a rectangular or right-angled trapezoidal vertical plate panel 62. In this case, the shape, location, and orientation of the vertical plate panel 62 may be determined such that the line of sight 70 intersects with a side of the vertical plate panel 62 that is directed radially outward. Most part of a vertical plate panel 62 can be covered by a flat plate panel 60 also in this way.

An adsorption area 48 is formed throughout the both surfaces of each of the vertical plate panels 62. The adsorption area 48 of each of the vertical plate panels 62 is substantially invisible from the shield opening 26. When part of a vertical plate panel 62 is visible from the shield opening 26, a boundary between an adsorption area and a condensation area may be determined using the line of sight 70 as in the case of a flat plate panel 60.

In this way, a large number of adsorption panels in the cryopanel assembly 20 are arranged in a lattice-like manner. The plurality of flat plate panels 60 are placed alternately with the plurality of second panel arrangements 63. The vertical plate panels 62 of each of the second panel arrangement 63 are arranged at an angle with the associated flat plate panel 60. As described, the first panel arrangement 61 forms a large number of adsorption sections 44 in cooperation with the plurality of second panel arrangements 63 (see FIG. 3 and FIG. 4). These adsorption sections 44 are arranged in a lattice-shaped pattern.

A multitude of adsorption sections 44 are arranged two-dimensionally such that the adsorption sections 44 are exposed to the shield side portion 36. The multitude of adsorption sections 44 form a plurality of adsorption section arrays arranged in a multi-layered way between the shield opening 26 and the shield bottom portion 34. In this way, the cryopanel assembly 20 has a matrix arrangement of the adsorption sections 44 arranged in a longitudinal direction and in a transverse direction.

Each of the plurality of flat plate panels 60 is adjacent to a corresponding second panel arrangement 63 on its upper side in the axial direction. As described, each of the flat plate panels 60 is a cover member that covers the corresponding second panel arrangement 63. The plurality of vertical plate panels 62 of the second panel arrangements 63 are partition members that separate a space between the flat plate panels 60. The vertical plate panels 62 extend in the axial direction between two adjacent flat plate panels 60 located above and below the vertical plate panel 62 in the axial direction such that a space between the two adjacent flat plate panels 60 are divided into a plurality of adsorption sections 44 in a rectangular strip shape. The plurality of adsorption sections 44 are arranged in the circumferential direction and form a single array of adsorption sections.

Each of the adsorption sections 44 includes a ceiling portion that covers the adsorption section 44, a side wall portion located between the adsorption section 44 and its adjacent adsorption section 44, and an opening part that is exposed to the shield side portion 36. The ceiling portion is provided by a flat plate panel 60, and the side wall portion is provided by a vertical plate panel 62. The opening part is a gas inlet from the gas receiving space 50 to the adsorption section 44. The opening part is rectangular when viewed from the shield side portion 36. The opening part is open to the gas receiving space 50, and no shielding that prevents the flowing of gas is provided between the adsorption section 44 and the shield side portion 36.

Note that an individual flat plate panel 60 may be divided into a plurality of panel pieces. In this case, an individual panel piece may provide a ceiling portion of a corresponding adsorption section 44. The opening part of an adsorption section 44 may have a shape other than a rectangular shape. For example, the opening part of the adsorption section 44 may be hexagonal, and the cryopanel assembly 20 may include an adsorption panel lattice in a honeycomb-like shape. In this case, the side wall portion of the adsorption section 44 may be inclined with respect to the ceiling portion.

Figure 5:
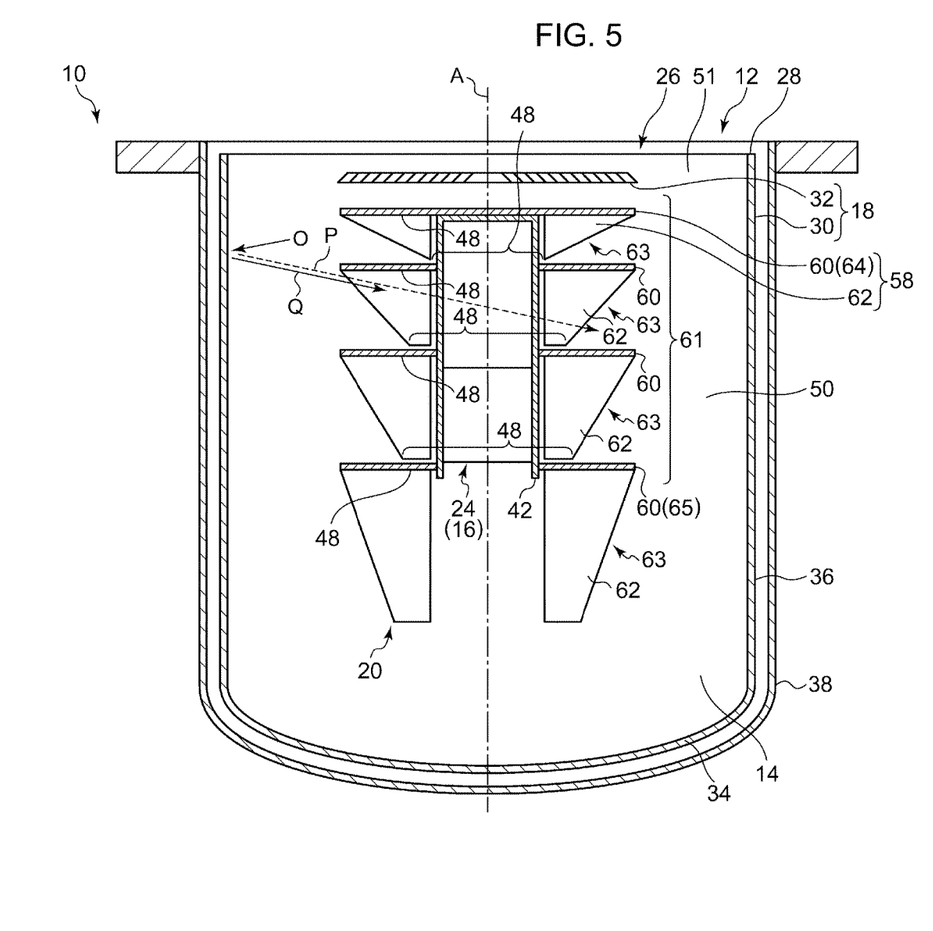
FIG. 5 is a view for explaining a method for vacuum pumping a non-condensable gas according to an embodiment of the present invention.

FIG. 5 is a view for explaining a method for vacuum pumping a non-condensable gas according to an embodiment of the present invention. As described above, the cryopump 10 is provided with a lattice-like adsorption panel arrangement that faces the shield side portion 36. The lattice-like arrangement of adsorption panels include a large number of adsorption sections 44 that are exposed to the shield side portion 36. This vacuum pumping method includes receiving a non-condensable gas molecule between the radiation shield 30 of the cryopump 10 and the cryopanel assembly 20 and adsorbing a non-condensable gas molecule on the lattice-like adsorption panel arrangement. This method may include reflecting, by the shield side portion 36, the non-condensable gas molecule received between the radiation shield 30 and the cryopanel assembly 20. The non-condensable gas molecule that has been reflected is adsorbed by any one of the large number of adsorption sections 44.

The angle of entry, to the cryopanel assembly 20, of the non-condensable gas molecule reflected by the shield side portion 36 may be nearly horizontal. If no vertical plate panel 62 is provided, the non-condensable gas molecule would pass through the cryopanel assembly 20 through a space between flat plate panels 60 as shown by a broken-line arrow P in FIG. 5. However, according to the present embodiment, a non-condensable gas molecule that enters the cryopanel assembly 20 at a small angle can be captured by a vertical plate panel 62 as shown by a solid arrow Q in FIG. 5.

According to the present embodiment, adsorption panels are arranged in a lattice shape. Therefore, a given adsorption panel (e.g., flat plate panel 60) has an angle at which the adsorption panel intersects with another adsorption panel (e.g., vertical plate panel 62). Therefore, such another adsorption panel (e.g., vertical plate panel 62) is located on the pathway of a gas molecule passing over and near the given adsorption panel (e.g., flat plate panel 60). Accordingly, the probability of a non-condensable gas molecule coming into contact with adsorption panels can be increased. Thus, the pumping speed of a non-condensable gas molecule can be increased.

It has been confirmed by simulation based on the Monte Carlo method that, in comparison with such a cryopump that has been proposed by the present applicant, the speed of pumping a hydrogen gas is approximately 20 percent better in a cryopump having a lattice-like adsorption panel arrangement according to the present embodiment.

A large number of cryopumps may be installed in a vacuum system. By using a cryopump according to the present embodiment, the number of cryopumps that are installed can be reduced. In other words, equivalent pumping speed can be achieved by a small number of cryopumps. For example, when three cryopumps are substituted for four cryopumps, the cost required for a cryopump system is reduced to approximately ¾. Therefore, the total cost for configuring a vacuum system can be greatly reduced.

According to the present embodiment, by adding a large number of vertical plate panels 62, a large adsorption area 48 can be formed on the cryopanel assembly 20. Therefore, the maximum amount of non-condensable gas molecules to be captured in the cryopump 10 can be increased.

Described above is an explanation based on the exemplary embodiments of the present invention. The invention is not limited to the above-mentioned embodiments, and various design modifications may be added. It will be obvious to those skilled in the art that such modifications are also within the scope of the present invention.

In the above-stated embodiment, the top panel 64 does not have an adsorption area 48 on the front surface thereof. However, an adsorption area 48 may be formed on the front surface of the top panel 64. For example, the top panel 46 may have a portion that protrudes and extends toward the inlet 12 or the inlet cryopanel 32. An adsorption area may be formed on a surface of such an extended portion. Also, a flat plate panel 60 other than the top panel 64 may similarly have a portion that protrudes and extends upward or downward in the axial direction on, for example, an outer circumferential portion.

The embodiments of the present invention can be also expressed as follows.

1. A cryopump comprising:
a radiation shield comprising a shield front end that defines a shield opening, a shield bottom portion, and a shield side portion that extends between the shield front end and the shield bottom portion; and
a cryopanel assembly cooled to a lower temperature than that of the radiation shield, comprising a first panel arrangement comprising a plurality of first adsorption panels, and a plurality of second panel arrangements each comprising a plurality of second adsorption panels,
wherein the first panel arrangement forms a multitude of adsorption sections arranged in a lattice-shaped pattern in cooperation with the plurality of second panel arrangements, each of the adsorption sections being exposed to the shield side portion.

2. The cryopump according to embodiment 1,
wherein each of the plurality of first adsorption panels and the plurality of second adsorption panels includes an adsorption area that is defined such that the adsorption area is substantially invisible from the shield opening.

3. The cryopump according to embodiment 1 or 2,
wherein each of the plurality of second adsorption panels is shaped so as to be substantially invisible from the shield opening.

4. The cryopump according to any one of embodiments 1 to 3,
wherein the plurality of first adsorption panels and the plurality of second panel arrangements are placed alternately, and wherein the plurality of second adsorption panels are arranged at an angle with the plurality of first adsorption panels.

5. The cryopump according to any one of embodiments 1 to 4,
wherein the plurality of first adsorption panels are arranged in an axial direction of the cryopump such that a front surface of each of the first adsorption panels is directed to the shield opening, and
wherein the plurality of second adsorption panels are arranged such that two adjacent second adsorption panels face each other in a circumferential direction that surrounds the axial direction.

6. The cryopump according to any one of embodiments 1 to 5,
wherein the plurality of second adsorption panels are mounted to a first adsorption panel that is adjacent to the plurality of second adsorption panels on a shield opening side such that the plurality of second adsorption panels protrude toward the shield bottom portion from the first adsorption panel.

It should be understood that the invention is not limited to the above-described embodiment, but may be modified into various forms on the basis of the spirit of the invention. Additionally, the modifications are included in the scope of the invention.

Priority is claimed to Japanese Patent Application No. 2013-57050, filed on Mar. 19, 2013, the entire content of which is incorporated herein by reference.

What is claimed is:

1. A cryopump comprising:
a radiation shield comprising a shield front end that defines a shield opening, a shield bottom portion, and a shield side portion that axially extends between the shield front end and the shield bottom portion; and
a cryopanel assembly cooled to a lower temperature than that of the radiation shield, comprising a first panel arrangement and a plurality of second panel arrangements, the first panel arrangement comprising a plurality of flat plate adsorption panels axially arranged between the shield opening and the shield bottom portion, each flat plate adsorption panel comprising a back surface adsorption area provided to capture a non-condensable gas by adsorption and arranged axially above and adjacent to a corresponding second panel arrangement, each second panel arrangement comprising a plurality of axially extending adsorption panels circumferentially arranged below the back surface adsorption area to form a plurality of adsorption sections, each adsorption section being exposed to the shield side portion, each axially extending adsorption panel comprising an axially extending adsorption area being differently angled depending on an axial distance from the shield opening to the axially extending adsorption panel, wherein
the axially extending adsorption panels extend from only a bottom of the flat plate adsorption panel and away from the shield opening.

2. The cryopump according to claim 1,
wherein each of the plurality of flat plate adsorption panels and the plurality of axially extending adsorption panels comprises an adsorption area that is defined such that the adsorption area is substantially invisible from the shield opening.

3. The cryopump according to claim 1,
wherein each of the plurality of axially extending adsorption panels is shaped so as to be substantially invisible from the shield opening.

4. The cryopump according to claim 1,
wherein the plurality of flat plate adsorption panels and the plurality of axially extending panel arrangements are placed alternately, and
wherein the plurality of axially extending adsorption panels are arranged at an angle with the plurality of flat plate adsorption panels.

5. The cryopump according to claim 1,
wherein the plurality of flat plate adsorption panels are arranged in an axial direction of the cryopump such that a front surface of each of the flat plate adsorption panels is directed to the shield opening, and
wherein the plurality of axially extending adsorption panels are arranged such that two adjacent axially extending adsorption panels face each other in a circumferential direction that surrounds the axial direction.

6. The cryopump according to claim 1,
wherein the plurality of axially extending adsorption panels are mounted to a flat plate adsorption panel that is adjacent to the plurality of axially extending adsorption panels on a shield opening side such that the plurality of axially extending adsorption panels protrude toward the shield bottom portion from the flat plate adsorption panel.

7. The cryopump according to claim 1,
wherein each axially extending adsorption panel is differently shaped depending on the axial distance from the shield opening to the axially extending adsorption panel.

8. The cryopump according to claim 1,
wherein the plurality of adsorption sections are circumferentially alternate with the axially extending adsorption panels.

9. The cryopump according to claim 1,
wherein a trajectory extends from a circumferential edge of the shield opening through a radially-adjacent outer circumferential edge of one of the flat plate adsorption panels,
wherein at least one of the axially extending adsorption panels positioned below the one flat plate adsorption panel is disposed entirely between the trajectory and a central axis of the shield opening.

10. A method for vacuum pumping a non-condensable gas, comprising:
receiving a non-condensable gas molecule between a radiation shield of a cryopump and a cryopanel assembly that is cooled to a lower temperature than that of the radiation shield; and
adsorbing the non-condensable gas molecule on the cryopanel assembly, wherein
the cryopanel assembly comprises a first panel arrangement and a plurality of second panel arrangements, the first panel arrangement comprising a plurality of flat plate adsorption panels axially arranged between a shield opening and a shield bottom portion of the radiation shield, each flat plate adsorption panel comprising a back surface adsorption area provided to capture a non-condensable gas by adsorption and arranged axially above and adjacent to a corresponding second panel arrangement, each second panel arrangement comprising a plurality of axially extending adsorption panels circumferentially arranged below the back surface adsorption area to form a plurality of adsorption sections, each adsorption section being exposed to an axially extending shield side portion of the radiation shield, each axially extending adsorption panel comprising an axially extending adsorption area being differently angled depending on an axial distance from the shield opening to the axially extending adsorption panel, wherein the axially extending adsorption panels extend from only a bottom of the flat plate adsorption panel and away from the shield opening.

11. The method according to claim 10, wherein the plurality of adsorption sections are circumferentially alternate with the axially extending adsorption panels.

12. The method according to claim 10, wherein a trajectory extends from a circumferential edge of the shield opening through a radially-adjacent outer circumferential edge of one of the flat plate adsorption panels, wherein at least one of the axially extending adsorption panels positioned below the one flat plate adsorption panel is disposed entirely between the trajectory and a central axis of the shield opening.

13. A cryopump comprising:

a radiation shield comprising a shield front end that defines a shield opening, a shield bottom portion, and a shield side portion that axially extends between the shield front end and the shield bottom portion; and a cryopanel assembly cooled to a lower temperature than that of the radiation shield, comprising a plurality of sets of adsorption compartments that are axially arranged in a multi-layered way between the shield opening and the shield bottom portion, wherein each set of adsorption compartments is differently angled depending on an axial distance from the shield opening to the set of adsorption compartments, and wherein each of the adsorption compartments comprises a ceiling portion that covers the adsorption compartment, a side wall portion located between adjacent adsorption compartments, and a gas inlet part that is exposed to the shield side portion, the ceiling portion comprising a back surface adsorption area provided to capture a non-condensable gas by adsorption, the side wall portion extending from only a bottom of the ceiling portion and away from the shield opening.

14. The cryopump according to claim 13, wherein a trajectory extends from a circumferential edge of the shield opening through a radially-adjacent outer circumferential edge of one of the ceiling portions, wherein the associated adsorption compartments are disposed entirely between the trajectory and a central axis of the shield opening.

* * * * *